(12) United States Patent
Hutchins et al.

(10) Patent No.: US 8,441,497 B1
(45) Date of Patent: May 14, 2013

(54) INTERPOLATION OF VERTEX ATTRIBUTES IN A GRAPHICS PROCESSOR

(75) Inventors: Edward A. Hutchins, Mountain View, CA (US); Michael J. M. Toksvig, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 854 days.

(21) Appl. No.: 11/890,838

(22) Filed: Aug. 7, 2007

(51) Int. Cl.
G09G 5/00 (2006.01)
G05G 5/02 (2006.01)
G06K 9/32 (2006.01)

(52) U.S. Cl.
USPC ........... 345/586; 345/606; 345/611; 345/643; 382/300

(58) Field of Classification Search .......... 345/418–420, 345/428, 5, 81, 582–586, 606, 611, 639, 345/643; 382/254, 274, 300
See application file for complete search history.

(56) References Cited

U.S. PATENT DOCUMENTS

| | | | |
|---|---|---|---|
| 4,208,810 A | 6/1980 | Rohner et al. | |
| 4,667,308 A | 5/1987 | Hayes et al. | |
| 5,170,152 A | 12/1992 | Taylor | |
| 5,268,995 A | 12/1993 | Diefendorff et al. | |
| 5,270,687 A | 12/1993 | Killebrew, Jr. | |
| 5,285,323 A | 2/1994 | Hetherington et al. | |
| 5,313,567 A | 5/1994 | Civanlar et al. | |
| 5,384,912 A | 1/1995 | Ogrinc et al. | |
| 5,424,755 A | 6/1995 | Lucas et al. | |
| 5,461,423 A | 10/1995 | Tsukagoshi | |
| 5,487,022 A | 1/1996 | Simpson et al. | |
| 5,544,292 A | 8/1996 | Winser | |
| 5,557,298 A | 9/1996 | Yang et al. | |
| 5,579,473 A | 11/1996 | Schlapp et al. | |
| 5,594,854 A | 1/1997 | Baldwin et al. | |
| 5,604,824 A | 2/1997 | Chui et al. | |
| 5,613,050 A | 3/1997 | Hochmuth et al. | |
| 5,710,577 A | 1/1998 | Laumeyer | |
| 5,748,202 A | 5/1998 | Nakatsuka et al. | |
| 5,764,228 A | 6/1998 | Baldwin | |
| 5,777,628 A | 7/1998 | Buck-Gengler | |
| 5,801,711 A | 9/1998 | Koss et al. | |
| 5,808,617 A | 9/1998 | Kenworthy et al. | |
| 5,818,456 A | 10/1998 | Cosman et al. | |
| 5,831,623 A | 11/1998 | Negishi et al. | |
| 5,844,569 A | 12/1998 | Eisler et al. | |
| 5,856,829 A | 1/1999 | Gray, III et al. | |

(Continued)

FOREIGN PATENT DOCUMENTS

CN 101819676 9/2010

OTHER PUBLICATIONS

Euh, J., Chittamuru, J., Burleson, W., Cordic Vector Interpolator for Power-Aware 3D Computer Graphics, Oct. 2002, IEEE Workshop on Signal Processing Systems, pp. 240-245.

(Continued)

*Primary Examiner* — Wesner Sajous

(57) ABSTRACT

Vertex data can be accessed for a graphics primitive. The vertex data includes homogeneous coordinates for each vertex of the primitive. The homogeneous coordinates can be used to determine perspective-correct barycentric coordinates that are normalized by the area of the primitive. The normalized perspective-correct barycentric coordinates can be used to determine an interpolated value of an attribute for the pixel. These operations can be performed using adders and multipliers implemented in hardware.

19 Claims, 5 Drawing Sheets

U.S. PATENT DOCUMENTS

| | | |
|---|---|---|
| 5,943,058 A | 8/1999 | Nagy |
| 5,963,210 A | 10/1999 | Lewis et al. |
| 5,977,977 A | 11/1999 | Kajiya et al. |
| 5,995,121 A | 11/1999 | Alcorn et al. |
| 6,002,410 A | 12/1999 | Battle |
| 6,009,435 A | 12/1999 | Taubin et al. |
| 6,028,608 A | 2/2000 | Jenkins |
| 6,031,548 A | 2/2000 | Gueziec et al. |
| 6,052,113 A | 4/2000 | Foster |
| 6,072,500 A | 6/2000 | Foran et al. |
| 6,118,452 A | 9/2000 | Gannett |
| 6,130,673 A | 10/2000 | Pulli et al. |
| 6,160,557 A | 12/2000 | Narayanaswami |
| 6,166,743 A | 12/2000 | Tanaka |
| 6,191,794 B1 | 2/2001 | Priem et al. |
| 6,198,488 B1 | 3/2001 | Lindholm et al. |
| 6,208,198 B1 | 3/2001 | Lee |
| 6,222,550 B1 | 4/2001 | Rosman et al. |
| 6,229,553 B1 | 5/2001 | Duluk, Jr. et al. |
| 6,239,808 B1 | 5/2001 | Kirk et al. |
| 6,239,812 B1 | 5/2001 | Pettazzi et al. |
| 6,259,461 B1 | 7/2001 | Brown |
| 6,288,730 B1 | 9/2001 | Duluk, Jr. et al. |
| 6,304,268 B1 | 10/2001 | Iourcha et al. |
| 6,313,846 B1 | 11/2001 | Fenney et al. |
| 6,337,744 B1 | 1/2002 | Kuroda |
| 6,373,495 B1 | 4/2002 | Lin et al. |
| 6,400,372 B1 | 6/2002 | Gossweiler, III et al. |
| 6,421,053 B1 | 7/2002 | Johns et al. |
| 6,453,330 B1 | 9/2002 | Battle et al. |
| 6,456,291 B1 | 9/2002 | Fowler |
| 6,512,524 B1 * | 1/2003 | Mang ............................ 345/622 |
| 6,516,032 B1 | 2/2003 | Heirich et al. |
| 6,518,974 B2 | 2/2003 | Taylor et al. |
| 6,525,729 B1 | 2/2003 | Akerman et al. |
| 6,525,737 B1 | 2/2003 | Duluk, Jr. et al. |
| 6,542,971 B1 | 4/2003 | Reed |
| 6,597,363 B1 | 7/2003 | Duluk, Jr. et al. |
| 6,618,048 B1 | 9/2003 | Leather |
| 6,618,049 B1 | 9/2003 | Hansen |
| 6,621,509 B1 | 9/2003 | Eiref et al. |
| 6,636,214 B1 | 10/2003 | Leather et al. |
| 6,636,223 B1 | 10/2003 | Morein |
| 6,664,958 B1 | 12/2003 | Leather et al. |
| 6,664,960 B2 | 12/2003 | Goel et al. |
| 6,670,955 B1 | 12/2003 | Morein |
| 6,693,643 B1 | 2/2004 | Trivedi et al. |
| 6,711,603 B1 | 3/2004 | Takenaka |
| 6,717,576 B1 | 4/2004 | Duluk, Jr. et al. |
| 6,717,577 B1 | 4/2004 | Cheng et al. |
| 6,731,288 B2 | 5/2004 | Parsons et al. |
| 6,745,336 B1 | 6/2004 | Martonosi et al. |
| 6,745,390 B1 | 6/2004 | Reynolds et al. |
| 6,774,895 B1 | 8/2004 | Papakipos et al. |
| 6,791,569 B1 * | 9/2004 | Millet et al. .................. 345/611 |
| 6,807,620 B1 | 10/2004 | Suzuoki et al. |
| 6,819,331 B2 | 11/2004 | Shih et al. |
| 6,879,324 B1 | 4/2005 | Hoppe |
| 6,879,328 B2 | 4/2005 | Deering |
| 6,891,548 B2 | 5/2005 | Alcorn et al. |
| 6,912,695 B2 | 6/2005 | Ernst et al. |
| 6,919,895 B1 | 7/2005 | Solanki et al. |
| 6,968,296 B2 | 11/2005 | Royle |
| 6,982,722 B1 | 1/2006 | Alben et al. |
| 6,987,517 B1 | 1/2006 | Donovan et al. |
| 6,999,100 B1 | 2/2006 | Leather et al. |
| 7,034,828 B1 | 4/2006 | Drebin et al. |
| 7,042,462 B2 | 5/2006 | Kim et al. |
| 7,079,156 B1 | 7/2006 | Hutchins et al. |
| 7,098,924 B2 | 8/2006 | Prokopenko et al. |
| 7,102,639 B2 | 9/2006 | Oka |
| 7,106,336 B1 | 9/2006 | Hutchins |
| 7,117,238 B1 | 10/2006 | Foskett et al. |
| 7,145,566 B2 | 12/2006 | Karlov |
| 7,190,366 B2 | 3/2007 | Hutchins et al. |
| 7,224,359 B1 | 5/2007 | Papakipos et al. |
| 7,257,814 B1 | 8/2007 | Melvin et al. |
| 7,292,242 B1 * | 11/2007 | Wittenbrink et al. ......... 345/421 |
| 7,295,204 B2 | 11/2007 | Sfarti |
| 7,538,773 B1 | 5/2009 | Hutchins |
| 7,595,806 B1 | 9/2009 | Toksvig et al. |
| 2002/0089512 A1 | 7/2002 | Slade et al. |
| 2002/0089701 A1 | 7/2002 | Lu et al. |
| 2002/0158865 A1 | 10/2002 | Dye et al. |
| 2002/0163967 A1 | 11/2002 | Youn et al. |
| 2003/0016217 A1 * | 1/2003 | Vlachos et al. ................ 345/423 |
| 2003/0063087 A1 | 4/2003 | Doyle et al. |
| 2003/0201994 A1 | 10/2003 | Taylor et al. |
| 2004/0012597 A1 | 1/2004 | Zatz et al. |
| 2004/0012598 A1 | 1/2004 | Zatz |
| 2004/0012600 A1 | 1/2004 | Deering et al. |
| 2004/0078504 A1 | 4/2004 | Law et al. |
| 2004/0119710 A1 | 6/2004 | Piazza et al. |
| 2004/0125103 A1 | 7/2004 | Kaufman et al. |
| 2004/0145589 A1 | 7/2004 | Prokopenko et al. |
| 2004/0227755 A1 | 11/2004 | Sfarti |
| 2004/0246260 A1 | 12/2004 | Kim et al. |
| 2004/0257376 A1 | 12/2004 | Liao et al. |
| 2005/0066205 A1 | 3/2005 | Holmer |
| 2005/0088450 A1 | 4/2005 | Chalfin et al. |
| 2005/0124583 A1 * | 6/2005 | Becker et al. .................. 514/81 |
| 2005/0162436 A1 | 7/2005 | Van Hook et al. |
| 2005/0195187 A1 | 9/2005 | Seiler et al. |
| 2005/0231506 A1 | 10/2005 | Simpson et al. |
| 2005/0231519 A1 | 10/2005 | Solanki et al. |
| 2005/0237337 A1 | 10/2005 | Leather et al. |
| 2006/0197768 A1 | 9/2006 | Van Hook et al. |
| 2009/0096784 A1 * | 4/2009 | Wardetzky et al. ........... 345/420 |
| 2009/0167763 A1 * | 7/2009 | Waechter et al. ............. 345/426 |
| 2010/0189342 A1 * | 7/2010 | Parr et al. ...................... 382/154 |

OTHER PUBLICATIONS

Pixar, Inc.; PhotoRealistic RenderMan 3.9 Shading Language Extensions; Sep. 1999.

http://www.encyclopedia.com/html/s1/sideband.asp; Nov. 2010.

Narayanaswami, Efficient Gouraud Shading and Linerar Interpolation over Triangles, Computer Graphics Forum, vol. 14, No. 1, pp. 17-24, 1995 (1249WO).

* cited by examiner

INTERPOLATION OF VERTEX ATTRIBUTES IN A GRAPHICS PROCESSOR

FIELD

The present invention generally relates to computer graphics.

BACKGROUND

Recent advances in computer performance have enabled graphics systems to provide more realistic graphical images using personal computers, home video game computers, handheld devices, and the like. In such graphics systems, a number of procedures are executed to "render" or draw graphics primitives to the screen of the system. A "graphics primitive" is a basic component of a graphic, such as a point, line, polygon, or the like. Rendered images are formed with combinations of these graphics primitives. Many procedures may be utilized to perform three-dimensional (3-D) graphics rendering.

Specialized graphics processing units (GPUs) have been developed to increase the speed at which graphics rendering procedures are executed. The GPUs typically incorporate one or more rendering pipelines. Each pipeline includes a number of hardware-based functional units that are designed for high-speed execution of graphics instructions/data. Generally, the instructions/data are fed into the front end of a pipeline and the computed results emerge at the back end of a pipeline. The hardware-based functional units, cache memories, firmware, and the like, of the GPUs are designed to operate on the basic graphics primitives and produce real-time rendered 3-D images.

Graphics primitives such as polygons are generally broken down into triangles for rendering. To render a 3-D object on a two-dimensional (2-D) display device, various attribute values (e.g., red, green and blue color values) are specified at each vertex of a given triangle, and the attribute values are interpolated across the triangle. To achieve the correct visual effect, it is necessary to account for the positions of the vertices in 3-D screen space, referred to as perspective correction. Generally speaking, attribute values at the vertex closest to the viewer may need to be weighted more than values at the other vertices. Also, the weight given to values at more distant vertices can depend on how far the viewer is from those vertices (here, distance refers to the distance in screen space). Consequently, perspective correction can be computationally expensive and slow because the interpolation of attribute values across the triangle is typically not linear.

There is increasing interest in rendering 3-D graphical images in handheld devices such as cell phones, personal digital assistants (PDAs), and other devices where cost and power consumption are important design considerations. A method or system for perspective correction that can be efficiently implemented in such devices would therefore be valuable.

SUMMARY

Embodiments of the present invention provide methods and systems for perspective correction that can be implemented in devices where cost and power consumption are key considerations.

In one embodiment, vertex data is accessed for a graphics primitive. The vertex data includes homogeneous coordinates for each vertex of the primitive. The homogeneous coordinates can be used to determine perspective-correct barycentric coordinates that are normalized by the area of the primitive. The normalized perspective-correct barycentric coordinates can be used to determine an interpolated value of an attribute for the pixel.

These operations can be efficiently performed in handheld or other portable, battery-operated devices (as well as in other types of devices) using adders and multipliers implemented in hardware. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
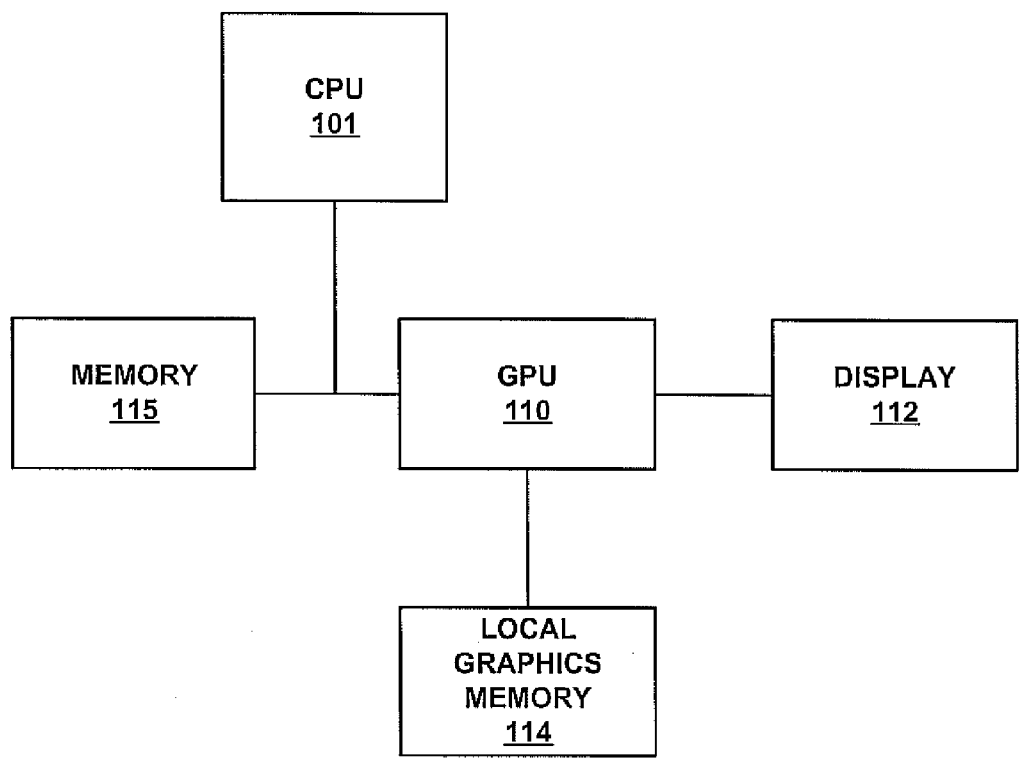
FIG. 1 is a block diagram showing components of a computer system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "determining" or "multiplying" or "adding" or "incrementing" or "holding" or "placing" or "registering" or "summing" or "rendering" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 shows a computer system 100 in accordance with one embodiment of the present invention. The computer system includes the components of a basic computer system in accordance with embodiments of the present invention providing the execution platform for certain hardware-based and software-based functionality. In general, the computer system comprises at least one central processing unit (CPU) 101, a system memory 115, and at least one graphics processor unit (GPU) 110. The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to system 100 to further increase its computational power. The GPU(s) is/are coupled to the CPU and the system memory. The computer system can be implemented as, for example, a desktop computer system or server computer system, having a powerful general-purpose CPU coupled to a dedicated graphics rendering GPU. In such an embodiment, components can be included that add peripheral buses, specialized graphics memory, input/output (I/O) devices, and the like. Similarly, computer system can be implemented as a handheld device (e.g., a cell phone, etc.) or a set-top video game console device.

The GPU can be implemented as a discrete component, a discrete graphics card designed to couple to the computer system via a connector (e.g., an Accelerated Graphics Port slot, a Peripheral Component Interconnect-Express slot, etc.), a discrete integrated circuit die (e.g., mounted directly on a motherboard), or an integrated GPU included within the integrated circuit die of a computer system chipset component (not shown) or within the integrated circuit die of a PSOC (programmable system-on-a-chip). Additionally, a local graphics memory 114 can be included for the GPU for high bandwidth graphics data storage.

Figure 2:
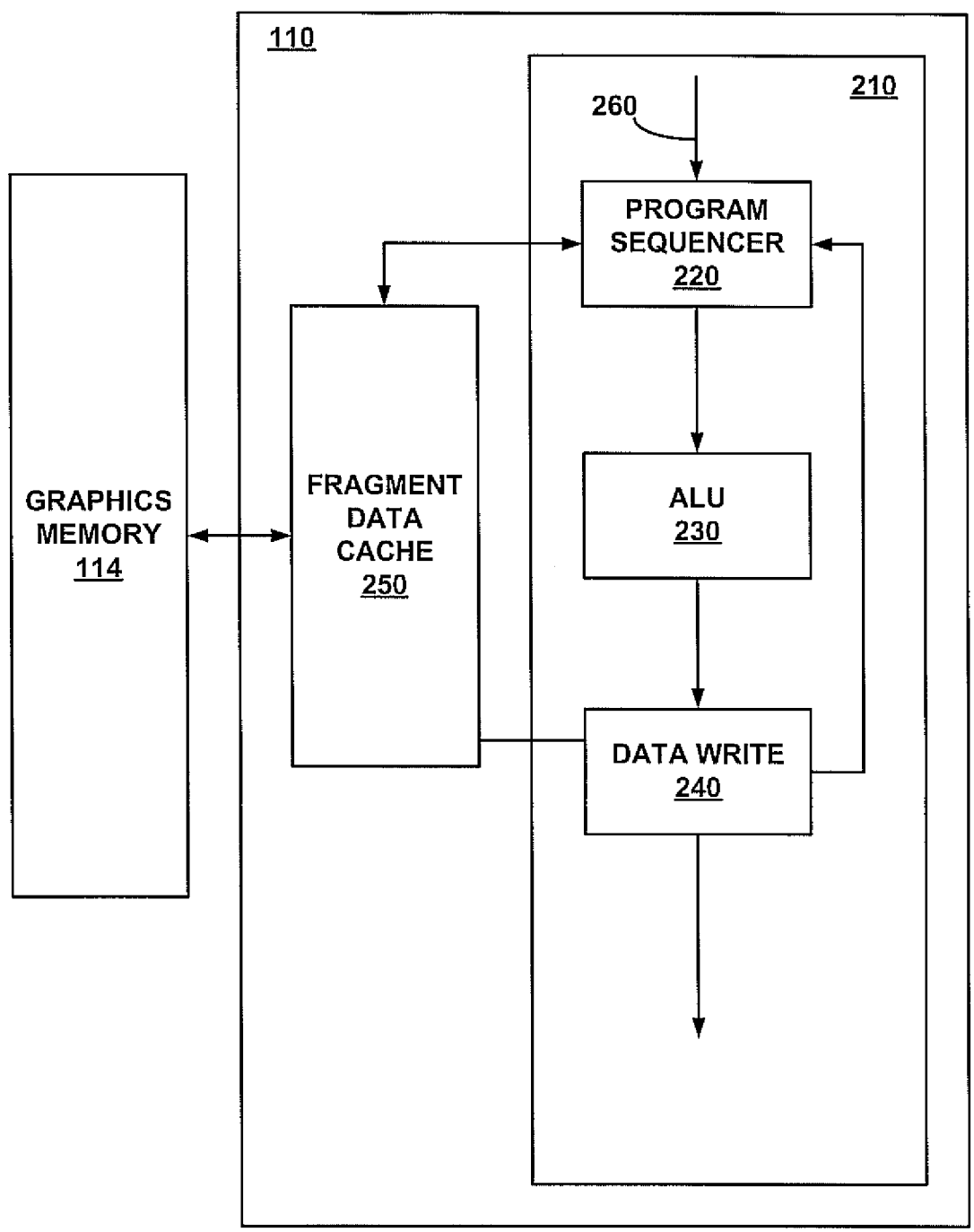
FIG. 2 is a block diagram showing components of a graphics processing unit in accordance with one embodiment of the present invention.

FIG. 2 shows a diagram 200 illustrating internal components of the GPU 110 and the graphics memory 114 in accordance with one embodiment of the present invention. As depicted in FIG. 2, the GPU includes a graphics pipeline 210 and a fragment data cache 250 which couples to the graphics memory as shown.

In the example of FIG. 2, a graphics pipeline 210 includes a number of functional modules. Three such functional modules of the graphics pipeline—for example, the program sequencer 220, the arithmetic logic unit (ALU) 230, and the data write component 240—function by rendering graphics primitives that are received from a graphics application (e.g., from a graphics driver, etc.). The functional modules 220-240 access information for rendering the pixels related to the graphics primitives via the fragment data cache 250. The fragment data cache functions as a high-speed cache for the information stored in the graphics memory (e.g., frame buffer memory).

The program sequencer functions by controlling the operation of the functional modules of the graphics pipeline. The program sequencer can interact with the graphics driver (e.g., a graphics driver executing on the CPU 101 of FIG. 1) to control the manner in which the functional modules of the graphics pipeline receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline over a common input 260 from an upstream functional module (e.g., from an upstream raster module, from a setup module, or from the graphics driver). The input 260 functions as the main fragment data pathway, or pipeline, between the functional modules of the graphics pipeline. Primitives are generally received at the front end of the pipeline and are progressively rendered into resulting rendered pixel data as they proceed from one module to the next along the pipeline.

In one embodiment, data proceeds between the functional modules 220-240 in a packet-based format. For example, the graphics driver transmits data to the GPU in the form of data packets, or pixel packets, that are specifically configured to interface with and be transmitted along the fragment pipe communications pathways of the pipeline. The pixel packets generally include information regarding a group or tile of pixels (e.g., four pixels, eight pixels, 16 pixels, etc.) and coverage information for one or more primitives that relate to the pixels. The pixel packets can also include configuration information that enables the functional modules of the pipeline to configure themselves for rendering operations. For example, the pixel packets can include configuration bits, instructions, functional module addresses, etc., that can be used by one or more of the functional modules of the pipeline to configure itself for the current rendering mode, or the like. In addition to pixel rendering information and functional module configuration information, the pixel packets can include shader program instructions that program the functional modules of the pipeline to execute shader processing on the pixels. For example, the instructions comprising a shader program can be transmitted down the graphics pipeline and be loaded by one or more designated functional modules. Once loaded, during rendering operations, the functional module can execute the shader program on the pixel data to achieve the desired rendering effect.

In this manner, the highly optimized and efficient fragment pipe communications pathway implemented by the functional modules of the graphics pipeline can be used not only to transmit pixel data between the functional modules (e.g., modules 220-240), but to also transmit configuration information and shader program instructions between the functional modules.

Referring still to FIG. 2, in the present embodiment, the program sequencer functions by controlling the operation of the other components of the graphics pipeline and working in conjunction with the graphics driver to implement a method for loading and executing an indeterminate length shader program. As used herein, the term "indeterminate length"

shader program refers to the fact that the shader programs that can be executed by the GPU are not arbitrarily limited by a predetermined, or format based, length. Thus for example, shader programs that can be executed can be short-length shader programs (e.g., 16 to 32 instructions long, etc.), normal shader programs (e.g., 64 to 128 instructions long, etc.), long shader programs (e.g., 256 instructions long, etc.), very long shader programs (e.g., more than 1024 instructions long, etc.) or the like.

To execute shader programs of indeterminate length, the program sequencer controls the graphics pipeline to execute such indeterminate length shader programs by executing them in portions. The program sequencer accesses a first portion of the shader program from the graphics memory and loads the instructions from the first portion into the plurality of stages of the pipeline (e.g., the ALU, the data write component, etc.) of the GPU to configure the GPU for program execution. As described above, the instructions for the first portion can be transmitted to the functional modules of the graphics pipeline as pixel packets that propagate down the fragment pipeline. A span of pixels (e.g., a group of pixels covered by a primitive, etc.) is then processed in accordance with the instructions from the first portion. A second portion of the shader program is then accessed (e.g., direct memory access, transferred in from the system memory 115 of FIG. 1) and instructions from the second portion are then loaded into the plurality of stages of the pipeline.

The span of pixels is then processed in accordance with the instructions from the second portion. In this manner, multiple shader program portions can be accessed, loaded, and executed to perform operations on the span of pixels. For example, for a given shader program that comprises a hundred or more portions, for each of the portions, the GPU can process the span of pixels by loading instructions for the portion and executing instructions for that portion, and so on until all the portions comprising the shader program are executed. This attribute enables embodiments of the present invention to implement the indefinite length shader programs. As described above, no arbitrary limit is placed on the length of a shader program that can be executed.

Figure 3:
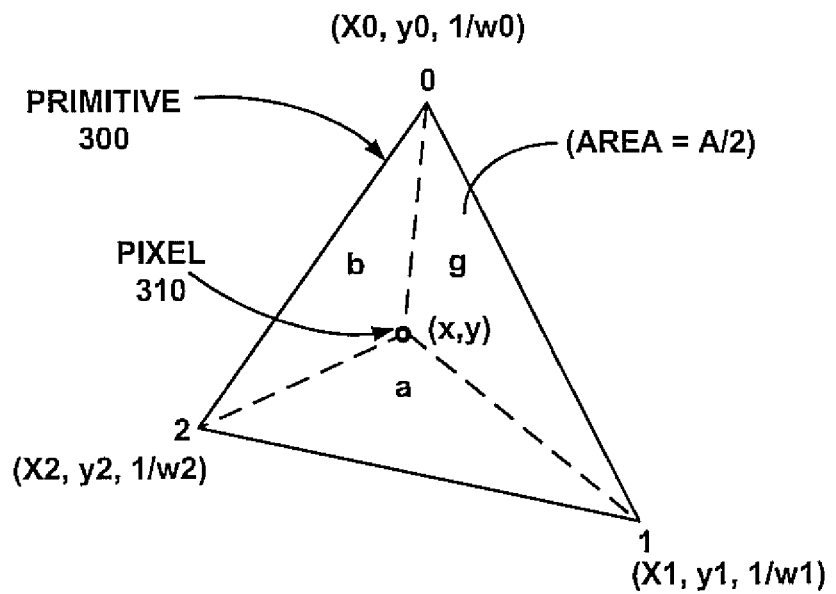
FIG. 3 illustrates a graphics primitive according to embodiments of the present invention.

FIG. 3 illustrates a graphics primitive 300 (e.g., a triangle) according to embodiments of the present invention. The vertices of the primitive are labeled 0, 1 and 2. A set of homogeneous coordinates (x, y, 1/w) is associated with each of the vertices 0, 1 and 2, where "x," "y" and "w" are conventionally defined for two-dimensional projective or screen space. That is, "x" and "y" refer to two axes in a coordinate system, and "w" refers to a third dimension in screen space that represents the distance or depth into the screen of a rendered object—in a sense, "w" represents the distance in screen space between a rendered object and a viewer. Vertex 0 has homogeneous coordinates (x0, y0, 1/w0), vertex 1 has homogeneous coordinates (x1, y1, 1/w1), and vertex 2 has homogeneous coordinates (x2, y2, 1/w2). In addition, one or more attribute values are associated with each vertex 0, 1 and 2. For example, color values (e.g., red, green, blue) may be associated with each vertex. Other types of attributes include, but are not limited to, alpha values, texture values, and normals.

In general, a number of pixels are covered by the primitive. An example pixel 310 is located at position (x, y) in the plane defined by the primitive.

The primitive has area A/2, where A is equal to (x1−x0)(y2−y0)−(x2−x0)(y1−y0). That is, the area A is actually the area of a parallelogram that includes the primitive and the mirror image of the primitive—it is simpler to represent the area of a primitive as a parallelogram to avoid having to divide or multiply by a factor of two in subsequent calculations. Homogeneous barycentric coordinates or weights (that is, barycentric coordinates that represent the actual areas of the regions "a," "b" and "g," where the regions are also treated as parallelograms) for the pixel 310 are given by:

$$a(x,y)=(x1-x)(y2-y)-(x2-x)(y1-y); \quad (1)$$

$$b(x,y)=(x2-x)(y0-y)-(x0-x)(y2-y); \text{ and} \quad (2)$$

$$g(x,y)=(x0-x)(y1-y)-(x1-x)(y0-y). \quad (3)$$

The derivatives of "a," "b" and "g" are simple differences given by:

$$da/dx=y1-y2; \ da/dy=x2-x1; \quad (4)$$

$$db/dx=y2-y0; \ db/dy=x0-x2; \text{ and} \quad (5)$$

$$dg/dx=y0-y1; \ dg/dy=x1-x0. \quad (6)$$

The value of 1/w is linear in screen space, and its value at (x, y) can be expressed using the normalized screen-space barycentric coordinates a(x,y)/A, b(x,y)/A and g(x,y)/A, which are the barycentric coordinates of equations (1), (2) and (3) normalized by the area A. At vertices 0, 1 and 2, 1/w has values of 1/w0, 1/w1 and 1/w2, respectively, and can be computed as:

$$1/w(x,y)=a(x,y)/A*1/w0+b(x,y)/A*1/w1+g(x,y)/A*1/w2. \quad (7)$$

Equation (7) can be rewritten as:

$$A/w(x,y)=a(x,y)/w0+b(x,y)/w1+g(x,y)/w2. \quad (8)$$

Once a value of A/w(x,y) has been directly calculated using equations (1), (2), (3) and (8), a value of A/w for a pixel adjacent to the pixel 310 can be calculated using fixed-point stepper values based on equations (4), (5) and (6). For example, to determine "a," "b" and "g" for a pixel adjacent to pixel 310 (in any direction), the values of a(x,y), b(x,y) and g(x,y) can be incremented by the value of da/dx or da/dy, db/dx or db/dy, and dg/dx or dg/dy, respectively, depending on the direction of the adjacent pixel relative to the pixel 310, and the new values of "a," "b" and "g" can be used in equation (8) to determine a value of A/w for the adjacent pixel.

The values a(x,y)*w(x,y), b(x,y)*w(x,y) and g(x,y)*w(x,y) can be referred to as perspective-correct barycentric coordinates. Normalized perspective-correct barycentric coordinates, which are normalized by the area A and are linear in world space, are designated a_per, b_per and g_per. The normalized perspective-correct barycentric coordinates (a_per, b_per, g_per) have values of (1,0,0), (0,1,0) and (0,0,1) at vertices 0, 1 and 2, respectively.

Because a_per, for example, is linear in world space, a_per/w is linear in screen space and can be expressed using the normalized screen-space barycentric coordinates a(x,y)/A, b(x,y)/A and g(x,y)/A. At vertices 0, 1 and 2, a_per/w has values of 1/w0, 0/w1 (=0) and 0/w2 (=0), respectively. Accordingly:

$$a\_per(x,y)/w(x,y)=a(x,y)/A*1/w0+b(x,y)/A*0/w1+g(x,y)/A*0/w2;$$

or $$a\_per(x,y)/w(x,y)=a(x,y)/A*1/w0=a(x,y)/w0*1/A. \quad (9)$$

Equation (9) can be rewritten as:

$$a\_per(x,y)=a(x,y)/w0*w(x,y)/A. \quad (10)$$

In equation (10), the first multiplicand a(x,y)/w0 is the first addend of equation (8), and the second multiplicand w(x,y)/A is the reciprocal of A/w(x,y), which is given by equation (8).

In a similar manner:

$$b\_per(x,y) = b(x,y)/w1 * w(x,y)/A;\ \text{and}$$

$$g\_per(x,y) = g(x,y)/w2 * w(x,y)/A. \quad (12)$$

For the pixel 310 at location (x, y), values of a_per(x,y) and b_per(x,y) can be computed as:

$$temp\_a = a(x,y)/w0; \quad (13)$$

$$temp\_b = b(x,y)/w1; \quad (14)$$

$$temp\_g = g(x,y)/w2; \quad (15)$$

$$temp\_w = rcp(temp\_a + temp\_b + temp\_g); \quad (16)$$

$$a\_per = temp\_a * temp\_w;\ \text{and} \quad (17)$$

$$b\_per = temp\_b * temp\_w; \quad (18)$$

where rcp means reciprocal.

Because (a_per+b_per+g_per) is equal to unity (1), g_per can be computed as (1 minus a_per minus b_per). However, g_per can also be computed by multiplying temp_g and temp_w.

Equations (13)-(18) can be readily implemented in hardware using registers, adders and multipliers. As such, these operations can be efficiently performed in handheld devices (as well as in other types of devices) in which cost and power consumption are important design considerations. Furthermore, these operations result in normalized perspective-correct barycentric coordinates a_per, b_per and g_per that are normalized by the area of the primitive 300, but without an explicit step of dividing by area.

Furthermore, in a manner similar to that described above, subsequent values of a_per and b_per can be calculated using fixed-point stepper values. For example, once a value of a_per (x,y) has been determined for the pixel 310 at location (x, y), a value of a_per at a pixel adjacent to the pixel 310 can be determined by adding (da/dx)/w0 or (da/dy)/w0, depending on the direction of the adjacent pixel relative to pixel 310, where da/dx and da/dy are given by equation (4).

The attribute values at vertices 0, 1 and 2 are designated p0, p1 and p2, respectively. The attribute value p(x,y) for pixel 310 at location (x, y) is given by:

$$p(x,y) = a\_per * p0 + b\_per * p1 + g\_per * p2. \quad (19)$$

Because g_per=1−a_per−b_per, equation (19) can be written as:

$$p(x,y) = a\_per(dp0) + b\_per(dp1) + p2, \quad (20)$$

where dp0=(p0−p2) and dp1=(p1−p2).

Figure 4:
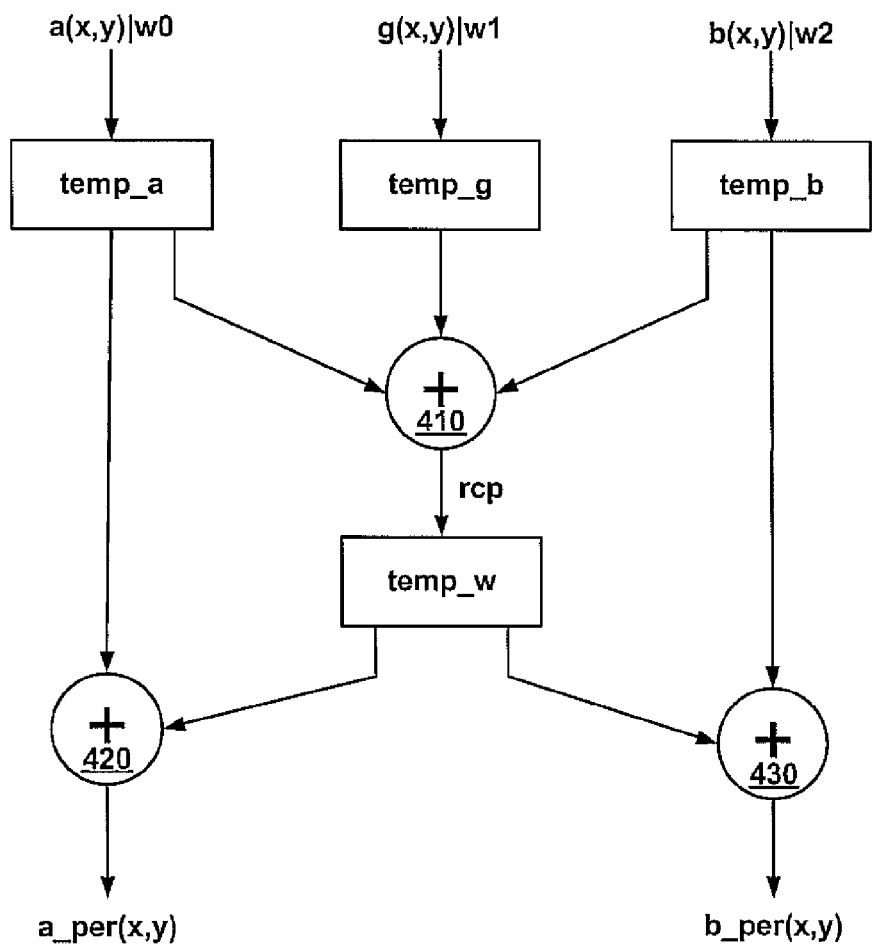
FIG. 4 illustrates the flow of data when determining normalized perspective-correct barycentric coordinates according to one embodiment of the present invention.

FIG. 4 illustrates the flow of data when determining normalized perspective-correct barycentric coordinates according to one embodiment of the present invention. In the example of FIG. 4, values of the ratios of the barycentric coordinates a(x,y) to w0, b(x,y) to w1, and g(x,y) to w2 (a(x,y)/w0, b(x,y)/w1 and g(x,y)/w2) are calculated in a preceding stage of pipeline 210 (FIG. 2) and placed into a first register temp_a, a second register temp_b, and a third register temp_g, respectively. As mentioned above, a(x,y)/w0, b(x,y)/w1 and g(x,y)/w2 can be computed either directly or using fixed-point stepper values.

The contents of the first, second and third registers are summed using adder 410, and the reciprocal of the sum is placed into a fourth register temp_w. The contents of the first and fourth registers are multiplied using multiplier 420 to compute the normalized perspective-correct barycentric coordinate a_per(x,y), and the contents of the second and fourth registers are multiplied using a multiplier 430 to compute the normalized perspective-correct barycentric coordinate b_per(x,y). The values of a_per(x,y) and b_per(x,y) can be used in the next stage of the pipeline 210 (FIG. 2) to determine interpolated attribute values for a pixel 310 (FIG. 3) based on equation (20). The interpolated attribute values can ultimately be used to render the pixel 310.

Figure 5:
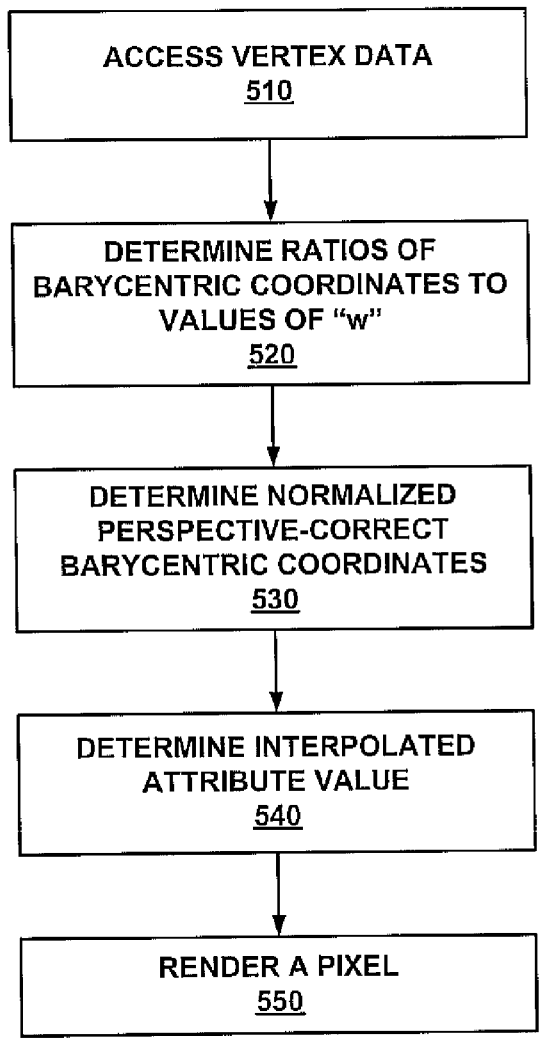
FIG. 5 is a flowchart of a method for interpolating attributes according to one embodiment of the present invention.

FIG. 5 is a flowchart 500 of an example of a method for interpolating attributes according to one embodiment of the present invention. Although specific steps are disclosed in flowchart 500, such steps are exemplary. That is, embodiments of the present invention are well-suited to performing various other steps or variations of the steps recited in flowchart 500. The steps in flowchart 500 may be performed in an order different than presented.

In block 510, vertex data for a graphics primitive is accessed. The vertex data includes homogeneous coordinates (x, y, 1/w) for each vertex of the primitive.

In block 520, the homogeneous coordinates are used to determine the ratios a(x,y)/w0, b(x,y)/w1 and g(x,y)/w2 for a pixel associated with (e.g., covered by) the primitive.

In block 530, the ratios a(x,y)/w0, b(x,y)/w1 and g(x,y)/w2 are used to determine normalized perspective-correct barycentric coordinates a_per(x,y) and b_per(x,y), which are normalized by the area of the primitive. The normalized perspective-correct barycentric coordinates a_per(x,y) and b_per(x, y) can be calculated by determining a reciprocal of the sum of the ratios a(x,y)/w0, b(x,y)/w1 and g(x,y)/w2, and then multiplying the reciprocal by a(x,y)/w0 and by b(x,y)/w1, respectively. A third normalized perspective-correct barycentric coordinate g_per(x,y) can optionally be determined.

In one embodiment, a(x,y)/w0, b(x,y)/w1 and g(x,y)/w2 are stored in first, second and third registers, respectively (e.g., temp_a, temp_b and temp_g). The reciprocal of the sum of the data in the first, second and third registers is stored in a fourth register (e.g., temp_w). The data in the first and fourth registers is multiplied to determine a first normalized perspective-correct barycentric coordinate a_per(x,y), and the data in the second and fourth registers is multiplied to determine a second normalized perspective-correct barycentric coordinate b_per(x,y).

In block 540, the normalized perspective-correct barycentric coordinates a_per(x,y) and b_per(x,y) can be used to determine an interpolated value of an attribute for the pixel at location (x, y). In one embodiment, the first normalized perspective-correct barycentric coordinate a_per(x,y) is multiplied by the difference between a first value for the attribute and a second value for the attribute (e.g., p0−p2), and the second normalized perspective-correct barycentric coordinate b_per(x,y) is multiplied by the difference between a third value for the attribute and the second value for the attribute (e.g., p1−p2). The results of these two multiplications are added to the second value (e.g., p2) to determine the value of the attribute for the pixel at location (x, y).

In block 550, the interpolated value can be used to render the pixel.

In summary, methods and systems for perspective correction by attribute interpolation, that can be efficiently implemented in handheld devices and other devices where cost and power consumption are key considerations, are described.

The foregoing descriptions of specific embodiments of the present invention have been presented for purposes of illustration and description. They are not intended to be exhaustive or to limit the invention to the precise forms disclosed, and many modifications and variations are possible in light of the above teaching. For example, embodiments of the present invention can be implemented on GPUs that are different in form or function from GPU 110 of FIG. 2. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method of interpolating attributes used in computer graphics, the method comprising:

accessing, using a graphics processing unit (GPU) executing a graphics pipeline, vertex data for a graphics primitive having an area associated therewith, the vertex data comprising homogeneous coordinates for each vertex of the primitive, the homogeneous coordinates comprising a first coordinate x, a second coordinate y, and a third coordinate w;

accessing, using said GPU, a first plurality of barycentric coordinates for a first pixel associated with the primitive;

using a first plurality of ratios, determining, in said graphics pipeline, a first plurality of normalized perspective-correct barycentric coordinates that are normalized by the area of the primitive, the first plurality of ratios comprising a respective value of the barycentric coordinates divided by a respective value of the third coordinate;

using the first plurality of normalized perspective-correct barycentric coordinates, determining, in said graphics pipeline, an interpolated value of an attribute for the first pixel and rendering the first pixel according to the interpolated value.

2. The method of claim 1 further comprising:
determining a reciprocal of a sum of the ratios; and
determining the normalized perspective-correct barycentric coordinates by multiplying the reciprocal and selected values of the ratios.

3. The method of claim 1 further comprising:
incrementing the first plurality of ratios to determine a second plurality of ratios for a second pixel that is adjacent the first pixel;
using the second plurality of ratios, determining a second plurality of normalized perspective-correct barycentric coordinates that are normalized by the area of the primitive; and
using the second plurality of normalized perspective-correct barycentric coordinates, determining an interpolated value of an attribute for the second pixel.

4. The method of claim 1 wherein the primitive comprises three vertices and further comprising:
placing the first plurality of ratios in first, second and third registers, respectively;
placing a reciprocal of a sum of data in the first, second and third registers in a fourth register;
multiplying data in the first and fourth registers to determine a first normalized perspective-correct barycentric coordinate; and
multiplying data in the second and fourth registers to determine a second normalized perspective-correct barycentric coordinate.

5. The method of claim 4 further comprising:
multiplying the first normalized perspective-correct barycentric coordinate by the difference between a first value for the attribute at a first vertex of the primitive and a second value for the attribute at a second vertex of the primitive to produce a first result;
multiplying the second normalized perspective-correct barycentric coordinate by the difference between a third value for the attribute at a third vertex of the primitive and the second value to produce a second result; and
adding the first result, the second result and the second value to determine the interpolated value of the attribute.

6. The method of claim 4 further comprising:
first multiplying data in the third and fourth registers to determine a third normalized perspective-correct barycentric coordinate;
second multiplying the first, second and third normalized perspective-correct barycentric coordinates by, respectively, a first value for the attribute at a first vertex of the primitive, a second value for the attribute at a second vertex of the primitive, and a third value for the attribute at a third vertex of the primitive; and
summing results of the first multiplying and the second multiplying to determine the interpolated value of the attribute.

7. A system comprising:
a memory;
a central processing unit (CPU) coupled to the memory; and
a graphics processor unit (GPU) coupled to the CPU, wherein the GPU executes a graphics pipeline operable for using a first plurality of normalized perspective-correct barycentric coordinates to determine an interpolated value of an attribute for a first pixel that is covered by a graphics primitive, the normalized perspective-correct barycentric coordinates normalized by an area associated with the primitive, wherein the first plurality of normalized perspective-correct barycentric coordinates are based on a first plurality of ratios, and wherein the first plurality of ratios are based on homogeneous coordinates associated with each vertex of the primitive, the homogeneous coordinates comprising a first coordinate x, a second coordinate y and a third coordinate w, wherein the ratios are determined by dividing a respective value of the barycentric coordinates by a respective value of the third coordinate, wherein the first pixel is rendered for display according to the interpolated value.

8. The system of claim 7 wherein the normalized perspective-correct barycentric coordinates are based on a product of: i) a reciprocal of a sum of the ratios and ii) selected values of the ratios.

9. The system of claim 7 wherein the GPU is further operable for using a second plurality of normalized perspective-correct barycentric coordinates to determine an interpolated value of an attribute for a second pixel that is adjacent the first pixel, the second plurality of normalized perspective-correct barycentric coordinates normalized by the area, wherein the second plurality of normalized perspective-correct barycentric coordinates are based on a second plurality of ratios, and wherein the second plurality of ratios are determined by incrementing the first plurality of ratios.

10. The system of claim 7 wherein the primitive comprises a triangle, wherein the pipeline comprises:
a first register, a second register and a third register for holding the first plurality of ratios;
an adder for computing a sum of data in the first, second and third registers;
a fourth register for holding a reciprocal of the sum; and
multipliers for multiplying data in the first and fourth registers to determine a first normalized perspective-correct barycentric coordinate and for multiplying data in the second and fourth registers to determine a second normalized perspective-correct barycentric coordinate.

11. The system of claim 10 wherein the interpolated value of the attribute is determined by: i) multiplying the first normalized perspective-correct barycentric coordinate by the difference between a first value for the attribute at a first vertex of the primitive and a second value for the attribute at a second vertex of the primitive to produce a first result; ii) multiplying the second normalized perspective-correct barycentric coordinate by the difference between a third value for the attribute at a third vertex of the primitive and the second value to produce a second result; and iii) adding the first result, the second result and the second value to determine the interpolated value of the attribute.

12. The system of claim 10 wherein the interpolated value of the attribute is determined by: i) first multiplying data in the third and fourth registers to determine a third normalized perspective-correct barycentric coordinate; ii) second multiplying the first, second and third normalized perspective-correct barycentric coordinates by, respectively, a first value for the attribute at a first vertex of the primitive, a second value for the attribute at a second vertex of the primitive, and a third value for the attribute at a third vertex of the primitive; and iii) summing results of the first multiplying and the second multiplying.

13. A method of interpolating attributes used in computer graphics, the method comprising:
   accessing, in a graphics pipeline executed by a processing unit, a first plurality of ratios comprising first, second and third ratios for a first pixel covered by a graphics primitive having an area associated therewith, wherein the first, second and third ratios are not normalized by the area of the primitive and wherein the ratios are determined by dividing a respective value of a barycentric coordinate associated with the primitive by a respective value of a coordinate associated with a vertex of the primitive;
   determining, in said graphics pipeline, a reciprocal of a sum of the first, second and third ratios;
   multiplying, in said graphics pipeline, the reciprocal and the first ratio to determine a first normalized perspective-correct barycentric coordinate that is normalized by the area of the primitive;
   determining, in said graphics pipeline, an interpolated value of an attribute for the first pixel using the first normalized perspective-correct barycentric coordinate; and rendering the first pixel according to the interpolated value.

14. The method of claim 13 further comprising:
   accessing vertex data for the primitive, the vertex data comprising homogeneous coordinates for each vertex of the primitive; and
   using the homogeneous coordinates, determining the first, second and third ratios.

15. The method of claim 13 further comprising:
   multiplying the reciprocal and the second ratio to determine a second normalized perspective-correct barycentric coordinate that is normalized by the area of the primitive; and
   determining the interpolated value of the attribute for the first pixel using the first and second normalized perspective-correct barycentric coordinates.

16. The method of claim 15 further comprising:
   registering the first, second and third ratios in first, second and third registers, respectively;
   registering the reciprocal in a fourth register;
   multiplying data in the first and fourth registers to determine the first normalized perspective-correct barycentric coordinate; and
   multiplying data in the second and fourth registers to determine the second normalized perspective-correct barycentric coordinate.

17. The method of claim 16 further comprising:
   multiplying the first normalized perspective-correct barycentric coordinate by the difference between a first value for the attribute at a first vertex of the primitive and a second value for the attribute at a second vertex of the primitive to produce a first result;
   multiplying the second normalized perspective-correct barycentric coordinate by the difference between a third value for the attribute at a third vertex of the primitive and the second value to produce a second result; and
   adding the first result, the second result and the second value to determine the interpolated value of the attribute.

18. The method of claim 16 further comprising:
   first multiplying data in the third and fourth registers to determine a third normalized perspective-correct barycentric coordinate;
   second multiplying the first, second and third normalized perspective correct barycentric coordinates by, respectively, a first value for the attribute at a first vertex of the primitive, a second value for the attribute at a second vertex of the primitive, and a third value for the attribute at a third vertex of the primitive; and
   summing results of the first multiplying and the second multiplying to determine the interpolated value of the attribute.

19. The method of claim 13 further comprising:
   incrementing the first plurality of ratios to determine a second plurality of ratios for a second pixel that is adjacent the first pixel;
   using the second plurality of ratios to determine a second plurality of normalized perspective-correct barycentric coordinates that are normalized by the area of the primitive; and
   using the second plurality of normalized perspective-correct barycentric coordinates to determine an interpolated value of an attribute for the second pixel.

* * * * *